US010075554B2

(12) United States Patent
Narasimhan et al.

(10) Patent No.: US 10,075,554 B2
(45) Date of Patent: Sep. 11, 2018

(54) DETECTING MOBILE DEVICE ATTRIBUTES

(71) Applicant: Facebook, Inc., Menlo Park, CA (US)

(72) Inventors: Mukund Narasimhan, Bellevue, WA (US); Yingyi Liang, Palo Alto, CA (US); Xiaoliang Wei, Sunnyvale, CA (US); Ita Pai, Seattle, WA (US); Bo Huai Victor Loh, Redwood City, CA (US); Sara Motiee, Seattle, WA (US); Haomin Yu, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 756 days.

(21) Appl. No.: 13/721,900

(22) Filed: Dec. 20, 2012

(65) Prior Publication Data

US 2014/0181193 A1 Jun. 26, 2014

(51) Int. Cl.
*G06F 15/16* (2006.01)
*H04L 29/08* (2006.01)
*G06F 17/30* (2006.01)
*G06Q 50/00* (2012.01)
*H04W 4/18* (2009.01)
*H04L 29/06* (2006.01)
*H04W 4/21* (2018.01)

(52) U.S. Cl.
CPC ...... *H04L 67/306* (2013.01); *G06F 17/30905* (2013.01); *G06Q 50/01* (2013.01); *H04L 69/22* (2013.01); *H04W 4/18* (2013.01); *H04W 4/21* (2018.02); *H04L 67/02* (2013.01)

(58) Field of Classification Search
CPC ....... H04L 67/306; H04L 69/22; H04L 67/02; H04W 4/21; H04W 4/18; G06F 17/30905; G06Q 50/01
USPC ........................................................ 709/204
See application file for complete search history.

(56) References Cited

U.S. PATENT DOCUMENTS

| 7,908,379 | B2 | 3/2011 | Droz | |
| 8,135,609 | B2* | 3/2012 | Britt et al. | 705/7.34 |
| 2002/0161802 | A1* | 10/2002 | Gabrick et al. | 707/517 |
| 2006/0031417 | A1* | 2/2006 | Narin | 709/219 |
| 2009/0019367 | A1* | 1/2009 | Cavagnari et al. | 715/716 |
| 2010/0114527 | A1* | 5/2010 | Lee | H04H 60/32 702/181 |
| 2010/0257023 | A1* | 10/2010 | Kendall et al. | 705/10 |

(Continued)

OTHER PUBLICATIONS

Wikipedia; *List of HTTP Header Fields*; http://en.wikipedia.org/wiki/List_of_HTTP_header_fields, Nov. 6, 2012.

(Continued)

*Primary Examiner* — Taylor Elfervig
*Assistant Examiner* — Oluwatosin Gidado
(74) *Attorney, Agent, or Firm* — Baker Botts L.L.P.

(57) ABSTRACT

In one embodiment, a method includes receiving a request for a webpage from a mobile-client system of a user, where the request includes an http-header, accessing information describing the user, determining the attributes of the mobile-client system based on the http-header and the information describing the user, and transmitting the webpage to the mobile-client system in response to the request, where the webpage has been customized based on the determined attributes of the mobile-client system.

19 Claims, 4 Drawing Sheets

(56) References Cited

U.S. PATENT DOCUMENTS

| | | | | |
|---|---|---|---|---|
| 2012/0254402 | A1* | 10/2012 | Panidepu | G06F 17/30905 709/224 |
| 2013/0104026 | A1* | 4/2013 | Reynar | G06Q 30/02 715/234 |
| 2013/0227018 | A1* | 8/2013 | Regan et al. | 709/204 |
| 2013/0239180 | A1* | 9/2013 | Weller | G06F 17/30893 726/4 |
| 2014/0074893 | A1* | 3/2014 | Griffin | 707/798 |
| 2014/0095362 | A1* | 4/2014 | Friedholm et al. | 705/34 |
| 2014/0108165 | A1* | 4/2014 | Neal et al. | 705/14.73 |

OTHER PUBLICATIONS

Wikipedia; *WURFL*; http://en.wikipedia.org/wiki/Wurfl, Nov. 6, 2012.

\* cited by examiner

DETECTING MOBILE DEVICE ATTRIBUTES

TECHNICAL FIELD

This disclosure generally relates to mobile computing systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

A mobile computing device—such as a smartphone, tablet computer, or laptop Computer—may include functionality for determining its location, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, in response to a request for a webpage from a mobile-client system, a device-detection system may be used to determine the attributes of the mobile-client system, such as its physical characteristics and technical capabilities, so that the requested webpage may be customized for the mobile-client system. The device-detection system may be physically or logically co-located with another system (such as, for example, a social-networking system, a 3rd-party application server, a web server, an enterprise server) in whole or in part. For example, the device-detection system may receive a request for a webpage from a mobile-client system. The device-detection system may then use information in the http-header received with the request, along with information about the user of the mobile-client system, to determine one or more attributes of the mobile-client system. A webpage that has been customized based on the attributes of the mobile-client system may then be transmitted to the system.

DESCRIPTION OF EXAMPLE EMBODIMENTS

Figure 1:
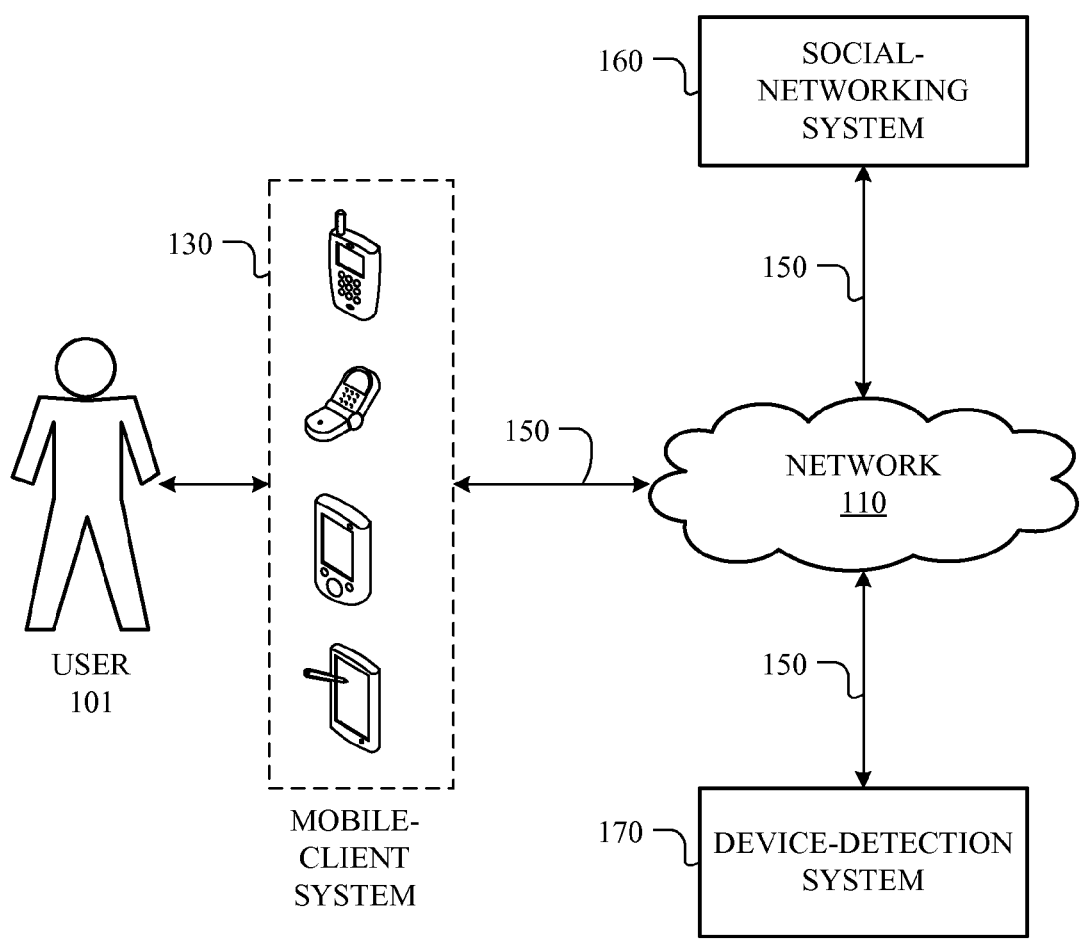
FIG. 1 illustrates an example network environment associated with a social-networking system.

FIG. 1 illustrates an example network environment 100 associated with a social-networking system. Network environment 100 includes a user 101, a mobile-client system 130, a social-networking system 160, and a device-detection system 170 connected to each other by a network 110. Although FIG. 1 illustrates a particular arrangement of user 101, mobile-client system 130, social-networking system 160, device-detection system 170, and network 110, this disclosure contemplates any suitable arrangement of user 101, mobile-client system 130, social-networking system 160, device-detection system 170, and network 110. As an example and not by way of limitation, two or more of mobile-client system 130, social-networking system 160, and device-detection system 170 may be connected to each other directly, bypassing network 110. As another example and not by way of limitation, two or more of mobile-client system 130, social-networking system 160, and device-detection system 170 may be physically or logically co-located with each other in whole or in part. Thus, device-detection system 170 may be a sub-system of social-networking system 160, or vice versa. As yet another example and not by way of limitation, one or more of mobile-client system 130, social-networking system 160, and device-detection system 170 may be physically or logically co-located with another system in whole or in part. Thus, device-detection system 170 may be a sub-system of a 3rd-party application server, a web server, an enterprise server, or another suitable system. Moreover, although FIG. 1 illustrates a particular number of users 101, client systems 130, social-networking systems 160, device-detection systems 170, and networks 110, this disclosure contemplates any suitable number of users 101, client systems 130, social-networking systems 160, device-detection systems 170, and networks 110. As an example and not by way of limitation, network environment 100 may include multiple users 101, mobile-client system 130, social-networking systems 160, device-detection systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. device-detection systems 170), such as, for example, by setting appropriate privacy settings. In particular embodiments, device-detection system 170 may be a network-addressable computing system that can host an online mobile device detection engine. Device-detection system 170 may generate, store, receive, and send device-related data, such as, for example, device attributes and other suitable device-related data. As an example and not by way of limitation, device-detection system 170 may implement one or more models or algorithms to identify devices and device attributes in response to a request for a network resource received at device-detection system 170 (or received at another systems that can access the device-detection system 170). In particular embodiments, the model or algorithm implemented by device-detection system 170 may use a machine-learned scoring formula, which the scoring algorithm may obtain automatically from a set of training data constructed from pairs of requests for webpages and selected types of mobile-computing devices 130, where appropriate. Device-detection system 170 may be accessed by the other components of network environment 100 either directly or via network 110. In particular embodiments, one or more users 101 may use one or more client systems 130 to access, send data to, and receive data from social-networking system 160 or device-detection system 170. Mobile-client system 130 may access social-networking system 160 or device-detection system 170 directly, via network 110, or via a third-party system. As an example and not by way of limitation, mobile-client system 130 may access device-detection system 170 via social-networking system 160. Mobile-client system 130 may be any suitable mobile computing device, such as, for example, a cellular telephone, a smartphone, a personal digital assistant (PDA), or a tablet computer.

In particular embodiments, mobile-client system 130 may include a web browser, such as, for example, MICROSOFT INTERNET EXPLORER (or INTERNET EXPLORER MOBILE), GOOGLE CHROME, GOOGLE ANDROID, APPLE SAFARI, OPERA (or OPERA MINI or OPERA MOBILE), BITSTREAM BOLT, or MOZILLA FIREFOX (or FIREFOX MOBILE), and may have one or more add-ons, plug-ins, or other extensions. To request access to a webpage, a user 101 at mobile-client system 130 may enter a Uniform Resource Locator (URL) or other address directing the web browser to a particular server (such as, for example, a server associated with a social-networking system 160, a 3rd-party application server, a web server, an enterprise server, a device-detection system 170, or another suitable system), and the web browser may generate a Hyper Text Transfer Protocol (HTTP) request and communicate the HTTP request to server. The request for the webpage may include an http-header comprising one or more header fields that define the operating parameters of the HTTP transaction. The server may accept the HTTP request and communicate to mobile-client system 130 one or more Hyper Text Markup Language (HTML) files responsive to the HTTP request. Mobile-client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect mobile-client system 130, social-networking system 160, and device-detection system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
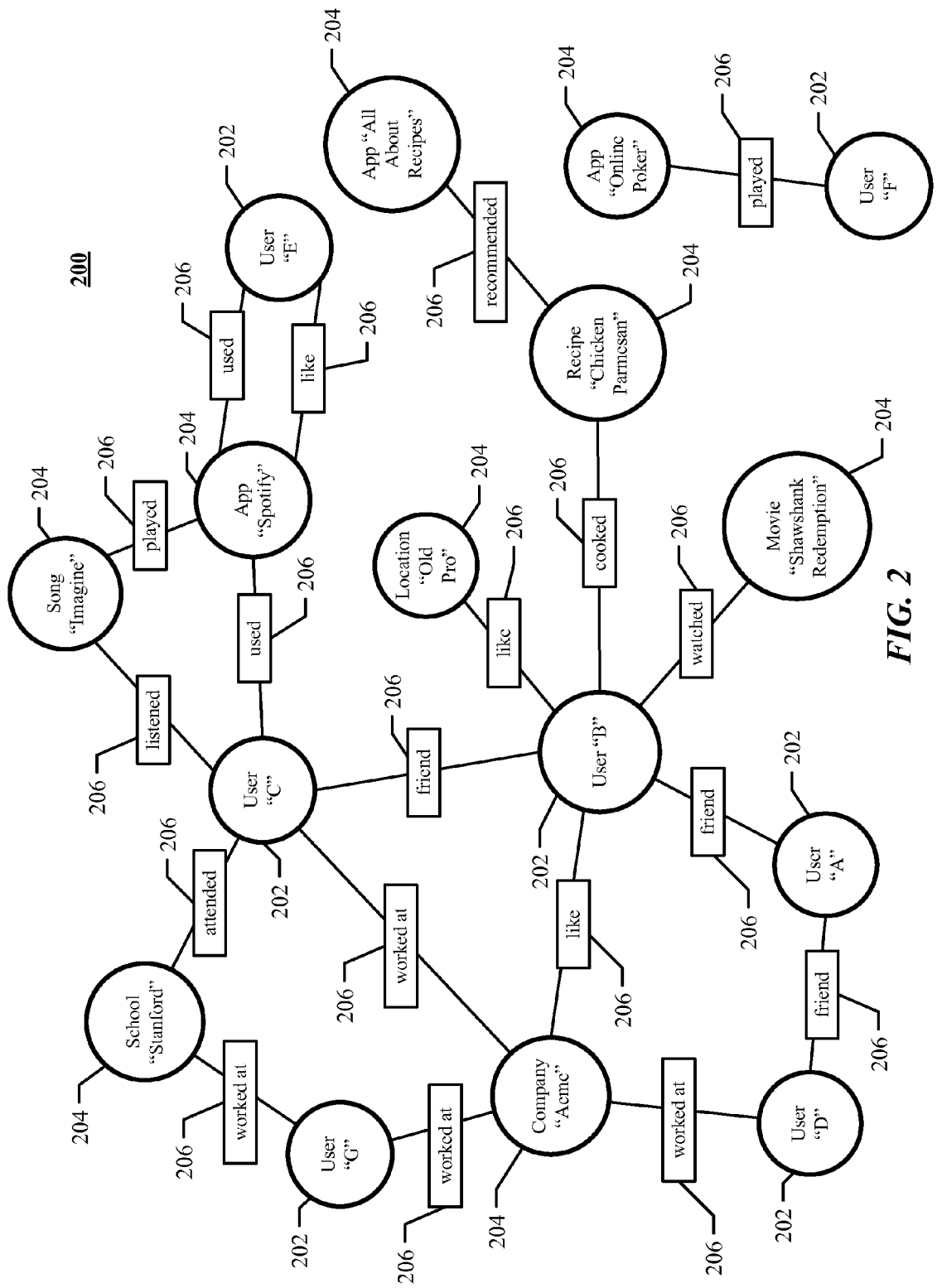
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, mobile-client system 130, or device-detection system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a mobile-client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's mobile-client system 130) may indicate that he or she likes the concept represented by the concept node 204 by clicking or selecting a "Like" icon, which may cause the user's mobile-client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile computing devices used to access websites come in a variety of shapes and sizes. A user 101 may use, for example, cell phones, personal digital assistants (PDAs), smartphones, tablets, etc., to access websites over the Internet. However, the physical characteristics and technical capabilities can vary among mobile devices and between mobile devices and traditional computers (e.g., desktop or laptop computers). Thus, some organizations offer mobile versions of their websites that are altered to display properly on a mobile device. For example, an organization with a website hosted at the domain name "example.com," may also have a mobile version of the same website hosted at the domain name, "m.example.com." HTTP requests made to m.example.com may be served with simplified versions of webpages designed to render appropriately on mobile devices. However, the differences between mobile devices make webpages meant to be displayed on one type of mobile device difficult or impossible to view on another mobile device.

Some websites may determine whether a device attempting to access the website is a mobile device, and also determine what type of device it is, by examining a user-agent string transmitted by the device. When a client makes an HTTP request, the request typically includes an http-header with one or more fields. One of these fields is typically a user-agent string, which may identify, for example, the type of device and/or browser that the client is using. A web-server application may then pass the request on to one or more server-side scripts, which may compare the user-agent string to a list of user-agent strings typically associated with mobile devices to determine if the device is a mobile device. For example, databases such as the Wireless Universal Resource File (WURFL) contain listings of user-agent strings associated with various devices, as well as the capabilities of such devices. The server-side scripts may make use of such databases to determine whether a given HTTP request originates from a mobile device by comparing the user-agent string of the HTTP request with one or more user-agent strings of the database. However, in order to ensure substantial comprehensiveness across the vast number of known devices, such databases tend to be enormous, making the comparison resource-intensive for server-side scripts. Moreover, it is often necessary to continually update such databases to ensure that they account for all mobile devices, as new user-agent strings or mobile devices arise, which means that device information provided by such databases may often be inaccurate. Thus, it may be desirable to use a method of identifying mobile devices and their attributes that does not rely on such databases.

In particular embodiments, in response to a request for a webpage from a mobile-client system 130, a device-detection system 170 may be used to determine the attributes of the mobile-client system 130, such as its physical characteristics and technical capabilities, so that the requested webpage may be customized for the mobile-client system 130. The device-detection system 170 may be physically or logically co-located with another system (such as, for example, a social-networking system 160, a 3rd-party application server, a web server, an enterprise server, or another suitable system) in whole or in part. As an example and not by way of limitation, the device-detection system 170 may receive a request for a webpage from a mobile-client system 130. The device-detection system 170 may access information about the user of the mobile-client system 130, such as, for example, survey information from the user, information received from other applicants on the mobile device, social-networking information related to the user, or other relevant information about the user. The device-detection system 170 may then use information in the http-header received with the request, along with information about the user of the mobile-client system 130, to determine one or more attributes of the mobile-client system 130. The device-detection system 170 may use one or more models or algorithms to predict or otherwise identify the attributes. A webpage that has been customized based on the attributes of the mobile-client system 130 may then be transmitted. Although this disclosure describes determining the attributes of mobile devices in a particular manner, this disclosure contemplates determining that attributes of mobile devices in any suitable manner.

In particular embodiments, the device-detection system 170 may receive a request for a webpage from a mobile-client system 130 of a user. The request may include an http-header. The http-header may include a variety of header field that define the operating parameters of the HTTP transaction. As an example and not by way of limitation, the http-header may include a user-agent string that describes one or more attributes of the browser client on the mobile-client system 130 making the request for the webpage. As another example and not by way of limitation, the http-header may include an accept string that describes the types of content that are acceptable. As yet another example and not by way of limitation, the http-header may include an accept-encoding string that describes the types of encodings that are acceptable. Three example http-headers are provided below:

(1) Example http-header from a desktop computer using a FIREFOX browser client:
   User agent: Mozilla/5.0 (Macintosh; Intel Mac OS X 10.8; rv:15.0)
   Gecko/20100101 Firefox/15.0.1
   Accept: text/html, application/xhtml+xml, application/xml; q=0.9, */*; q=0.8
   Accept encoding: gzip, deflate.
(2) Example http-header from a desktop computer using a CHROME browser client:
   User agent: Mozilla/5.0 (Macintosh; Intel Mac OS X 10_8_2)
   AppleWebKit/537.4 (KHTML, like Gecko) Chrome/22.0.1229.79 Safari/537.4
   Accept: text/html, application/xhtml+xml, application/xml; q=0.9, */*; q=0.8
   Accept encoding: gzip, deflate, sdch.
(3) Example http-header from a mobile device using a SAFARI browser client:
   User agent: Mozilla/5.0 (iPhone; CPU iPhone OS 6.0 like Mac OS X)
   ppleWebKit/536.26 (KHTML, like Gecko) Version 6.0 Mobile/10A403
   Safari/8536.25
   Accept: text/html, application/xhtml+xml, application/xml; q=0.9, */*; q=0.8
   Accept encoding: gzip, deflate.

Although this disclosure describes receiving particular requests for webpages in a particular manner, this disclosure contemplates receiving any suitable request for webpages in any suitable manner.

In particular embodiments, the device-detection system 170 may access information describing the user of the mobile-client system 130 (also referred to as the "first user"). The information describing the user may include, for example, information received from the user's mobile device, survey information from the user, social-networking information related to the user, other suitable information about the user, or any combination thereof. Although this disclosure describes accessing particular information about users in a particular manner, this disclosure contemplates accessing any suitable information about users in any suitable manner.

In particular embodiments, the information describing the user may include information received from the mobile-client system 130. In response to the request for a webpage from the mobile-client system 130, the device-detection system 170 may access or otherwise receive information form the mobile-client system 130 that describes the mobile-client system 130 or describes its attributes. As an example and not by way of limitation, the device-detection system 170 may determine one or more attributes of the mobile-client system 130 based on a browsing history associated with the user (or the device) requesting a webpage. The browsing history of a user may be determined by accessing, for example, tracking cookies, browser logs, cached webpages, tracking pixels, page tags, or other suitable browsing history data associated with the mobile-client system 130. Particular versions of webpages may be formatted/customized for devices with particular attributes. If the browsing history shows that the user has previously accessed such webpages, then the device-detection system 170 may determine that the mobile-client system 130 of the user has one or more attributes associated with those previously accessed webpages. As another example and not by way of limitation, the device-detection system 170 may determine one or more attributes of the mobile-client system 130 based on information accessed from various applications installed on the mobile-client system 130. The mobile-client system 130 may have applications installed on it that can access, for example, the native APIs on the device, application reports, application logs, or other suitable information about the mobile-client system 130. The device-detection system 170 may be able to access the information from these applications in order to access information describing the mobile-client system 130. As yet another example and not by way of limitation, the device-detection system 170 may determine one or more attributes of the mobile-client system 130 based on cookies stored in association with a web browser of the mobile-client system 130. For example, an authentication cookie may be used to identify the user of the mobile-client system 130, or to directly identify the device. Although this disclosure describes receiving particular information from the mobile-client system 130 in a particular manner, this disclosure contemplates receiving any suitable information from the mobile-client system 130 in any suitable manner.

In particular embodiments, the information describing the user may include survey information provided by the user. The survey may be a suitable structured document allowing the user to input or otherwise provide information describing one or more attributes of the mobile-client system 130. As an example and not by way of limitation, the device-detection system 170 may transmit a survey to the user. For example, the survey may ask the user "Are you using device X?", or more generally, "What type of device are you using?" As another example, the survey may ask about particular attributes of the device. For example, the survey may ask the user "Are you using a device that supports MP4 video files?", or more generally, "What type of media content is supported on your mobile device?" The user may provide the information, for example, by entering the information directly or by selecting the relevant attributes from a list, as appropriate. In particular embodiments, the survey may be transmitted to the mobile-client system 130. In alternative embodiments, the survey may be transmitted to another client system associated with the user. As an example and not by way of limitation, the survey may be transmitted to a desktop or laptop computer of the user, asking for details about the user's mobile device. It may be more convenient for the user to complete the survey on the desktop or laptop computer, for example, because of the ability to use a standard keyboard and mouse to input survey responses. The device-detection system 170 may be able to identify the user on the desktop or laptop when the user accesses a website or other system that can identify the user, such as, for example, a social-networking system 160 or other system that requires authentication. Thus, the device-detection system 170 may be able to identify various devices associated with the user and transmit surveys to any appropriate system. After the survey is completed, it may be transmitted to the device-detection system 170, which may receive the survey with the information provided by the user. Although this disclosure describes receiving particular survey information in a particular manner, this disclosure contemplates receiving any suitable survey information in any suitable manner.

In particular embodiments, the information describing the user may include social-networking information related to the user of the mobile-client system 130. The social-networking information related to the user may include, for example, user-profile data related to the user or other users of the online social network, concept-profile data, social-graph information, other suitable data related to the online social network, or any combination thereof. The device-detection system 170 may then determine one or more attributes of the mobile-client system 130 based on social-graph information corresponding to the user of the mobile-client system 130. In particular embodiments, the information describing the user may include information associated with a profile page corresponding to the user. The profile page of the user may include, for example, content, declarations, or other information provided by the user. As an example and not by way of limitation, the user may include the user's address/country of residence, mobile phone number, mobile-service provider information (for example, the user may explicitly list this in his profile, or "like" a concept-profile page associated with his mobile-service provider), employment information, or other suitable information. This information about the user may be useful for identifying particular attributes of the mobile device. As an example and not by way of limitation, the device-detection system 170 may be able to access information identifying the mobile-service provider of the user and then access a list of mobile devices and/or device attributes commonly supported by the mobile-service provider, and then may use this list to predict the attributes of the user's mobile-client system 130. In particular embodiments, the information describing the user may include information associated with one or more other users of the online social network who are related to the user. As an example and not by way of limitation, a first user may be a member of a particular group or association in the online social network (e.g., the users all list being members of the same organization, or working for the same employer on their user-profile pages, or have "liked" the corresponding concept-profile pages), which also includes one or more second users. The device-detection system 170 may already have information describing one or more attributes of the mobile devices of these second user. The device-detection system 170 may then predict that the mobile-client system 130 of the first user has one or more of the same attributes as the devices of the second users. As another example and not by way of limitation, a first user's friends in the online social network (i.e., those represented in the social graph by user nodes 202 within one degree of separation of the first user) may have mobile device with particular attributes. The first user may be more likely to have a device that is the same or similar to the devices used by his friends. Thus, the device-detection system 170 may then predict that the mobile-client system 130 of the first user has one or more of the same attributes as the devices of the first user's friends. Although this disclosure describes receiving particular social-networking information in a particular manner, this disclosure contemplates receiving any suitable social-networking information in any suitable manner.

In particular embodiments, the device-detection system 170 may determine one or more attributes of the mobile-client system 130 based on the http-header received with the request for a webpage. In some cases, the http-header may explicitly identify some attributes of the mobile-client system 130. However, in many cases, not all relevant attributes are explicitly identified by the http-header. In these cases, the device-detection system 170 may use the information provided by the http-header, such as the user-agent string, browser-specific strings, or other relevant information, to determine the attributes that are relevant to formatting or customized the requested webpage. The device-detection system 170 may use the http-header information to identify or predict the physical characteristics and technical capabilities (collectively "attributes") of the mobile-client system 130. As an example and not by way of limitation, the device-detection system 170 may determine one or more of the following attributes of the mobile-client system 130: programming language support (e.g., JavaScript support), style-sheet language support (e.g., CSS support level), screen size (e.g., the screen diagonal measurement, or the screen pixel resolution), screen pixel density, keyboard type (e.g., physical keyboard, touchscreen keyboard), location-services support (e.g., using one or more of cellular signals, Wi-Fi signals, or GPS to determine the location of the mobile-client system 130), wireless communication support (e.g., Wi-Fi, BLUETOOTH, NFC, IR), image support (e.g., ability to display JPEG, GIF, or PNG images), video support (e.g., ability to display various video types), or other suitable attributes. Determining whether a mobile device has each of these attributes may be useful in order to help customize or properly format the webpages requested by the mobile device. Although this disclosure describes determining attributes of mobile-client systems 130 based on particular http-headers in a particular manner, this disclosure contemplates determining attributes of mobile-client systems 130 based on any suitable http-headers in any suitable manner. Moreover, although this disclosure describes determining particular attributes of mobile-client systems 130, this disclosure contemplates determining any suitable attributes of mobile-client systems.

In particular embodiments, the device-detection system 170 may determine one or more attributes of the mobile-client system 130 based on the accessed information describing the user of the mobile-client system 130. As described previously, information describing the user of a mobile device, such as, for example, information received from the user's mobile device, survey information from the user, social-networking information related to the user, other suitable information about the user, may be useful for determining various attributes about the user's mobile device. The device-detection system 170 may use information about the user of the mobile-client system 130 to identify or predict the physical characteristics and technical capabilities (such as, for example, as described previously) of the mobile-client system 130. As an example and not by way of limitation, the device-detection system 170 may receive information from an application installed on the mobile-client system (e.g., FACEBOOK MOBILE APP) that describes some of the physical or technical features of the mobile device, which may be used to determine the attributes of the mobile device. As another example and not by way of limitation, the device-detection system 170 may receive information survey information from the user that describes the user's mobile device, which may be used to determine the attributes of the mobile device. Although this disclosure describes determining attributes of mobile-client systems 130 based on particular user information in a particular manner, this disclosure contemplates determining attributes of mobile-client systems 130 based on any suitable user information in any suitable manner. Moreover, although this disclosure describes determining particular attributes of mobile-client systems 130, this disclosure contemplates determining any suitable attributes of mobile-client systems.

In particular embodiments, the device-detection system 170 may determine the attributes of a mobile-client system 130 using one or more models or algorithms to identify the attributes. The score may be, for example, a confidence score, a probability, a quality, a ranking, another suitable type of score, or any combination thereof. Thus, in particular embodiments, attributes having higher calculated scores may be more likely to be attributes actually possessed by the mobile-computing system 130. As an example and not by way of limitation, the device-detection system 170 may calculate a probability score for one or more device attributes based on information in the http-header received from the mobile-computing system 130 and information describing the user of the mobile-computing system 130. The following is an example algorithm that device-detection system 170 could use to calculate a probability score for a particular attribute of a mobile-client system 130:

$$s_1 = f(H_1, \ldots, H_m, U_1, \ldots, U_n)$$

where:

$s_1$ is the probability score for a first attribute, $H_1, \ldots, H_m$ are http-header fields 1 through m, and $U_1, \ldots, U_n$ are user-profile fields 1 through n.

Particular variable may be more useful for determining particular attributes. Although this disclosure describes calculating a score using particular variables, this disclosure contemplates calculating a score using any suitable variables. In particular embodiments, the model or algorithm implemented by the device-detection system 170 may use a machine-learned scoring formula. The scoring algorithm may obtain the scoring formula automatically from a set of training data constructed from data sets including information about, for example, requests for webpages from mobile devices, various users of mobile devices, and various types of mobile devices. In particular embodiments, the device-detection system 170 may determine the attributes of a mobile-client system 130 by calculating a score for one or more attributes and then identifying each attribute having a score greater than a threshold score. In this way, the device-detection system 170 may be able to ensure a relatively high degree of accuracy for correctly identifying attributes of mobile devices. As an example and not by way of limitation, only attributes with a calculated probability score greater than 0.9 may be identified as being attributes of a mobile-client system 130. Although this disclosure describes determining particular attributes of mobile-client systems 130 in a particular manner, this disclosure contemplates determining any suitable attributes of mobile-client systems 130 in any suitable manner.

In particular embodiments, the device-detection system 170 may transmit a webpage to the mobile-client system 130 in response to the request for the webpage from the mobile-client system 130. The webpage may be customized based on the determined attributes of the mobile-client system 130. As an example and not by way of limitation, if the mobile-client system 130 is a smartphone with a relatively small screen size (e.g., in the 2.6-inch to 4.5-inch range), then the webpage may be formatted so that the content can be displayed appropriately in the smaller screen. Some content may be rearranged to fit the smaller screen, while other content may be reformatted or even excluded. However, if the mobile-client system 130 is a tablet device with a relatively large screen size (e.g., 7.0-inch to 10.1-inch range), then the webpage may use the same formatting for the content as is used on traditional computing devices (i.e., the formatting used for desktops or laptops). The requested webpage may be customized in a variety of ways. As an example and not by way of limitation, a server-side script may specifically format the webpage for the mobile-client system 130. As another example and not by way of limitation, a server-side script may forward the request to another server-side script associated with the mobile version of the webpage. The transmitted webpage may then be displayed to the user on the mobile-client system 130. In particular embodiments, the device-detection system 170 may also transmit advertisements or other sponsored content to the mobile-client system 130 in response to the request for the webpage. The advertisements may be included in as part of the webpage, or separately. The advertisements may correspond to one or more of the objects referenced in the content of the transmitted webpage. Although this disclosure describes transmitting particular webpages in a particular manner, this disclosure contemplates transmitting any suitable webpages in any suitable manner.

Figure 3:
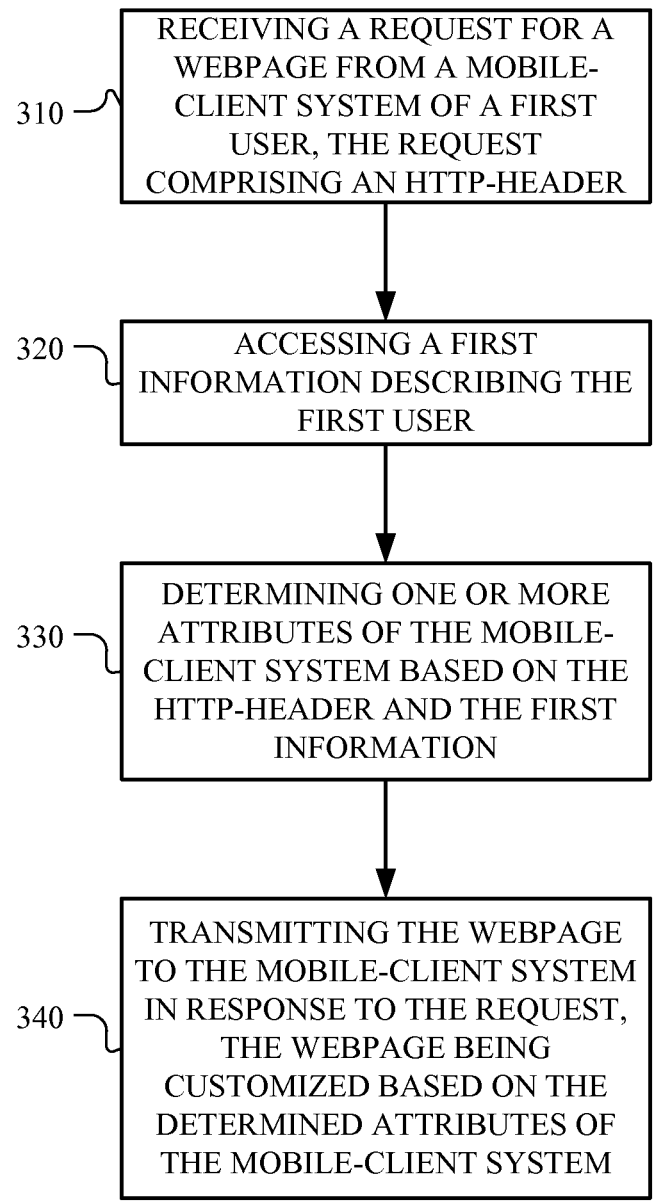
FIG. 3 illustrates an example method for determining the capabilities of a mobile device.

FIG. 3 illustrates an example method 300 for determining the capabilities of a mobile device. The method may begin at step 310, where a device-detection system 170 may receive a request for a webpage from a mobile-client system 130 of a first user. The request for the webpage may comprise an http-header, which may include various fields, such as a user-agent string. The device-detection system 170 may be physically or logically co-located with another system (such as, for example, a social-networking system 160, a 3rd-party application server, a web server, an enterprise server, or another suitable system) in whole or in part. At step 320, the device-detection system 170 may access a first information describing the first user. At step 330, the device-detection system 170 may determine one or more attributes of the mobile-client system 130 based on the http-header and the first information. At step 340, the device-detection system 170 may transmit the webpage to the mobile-client system 130 in response to the request. The transmitted webpage may be customized based on the determined attributes of the mobile-client system 130. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
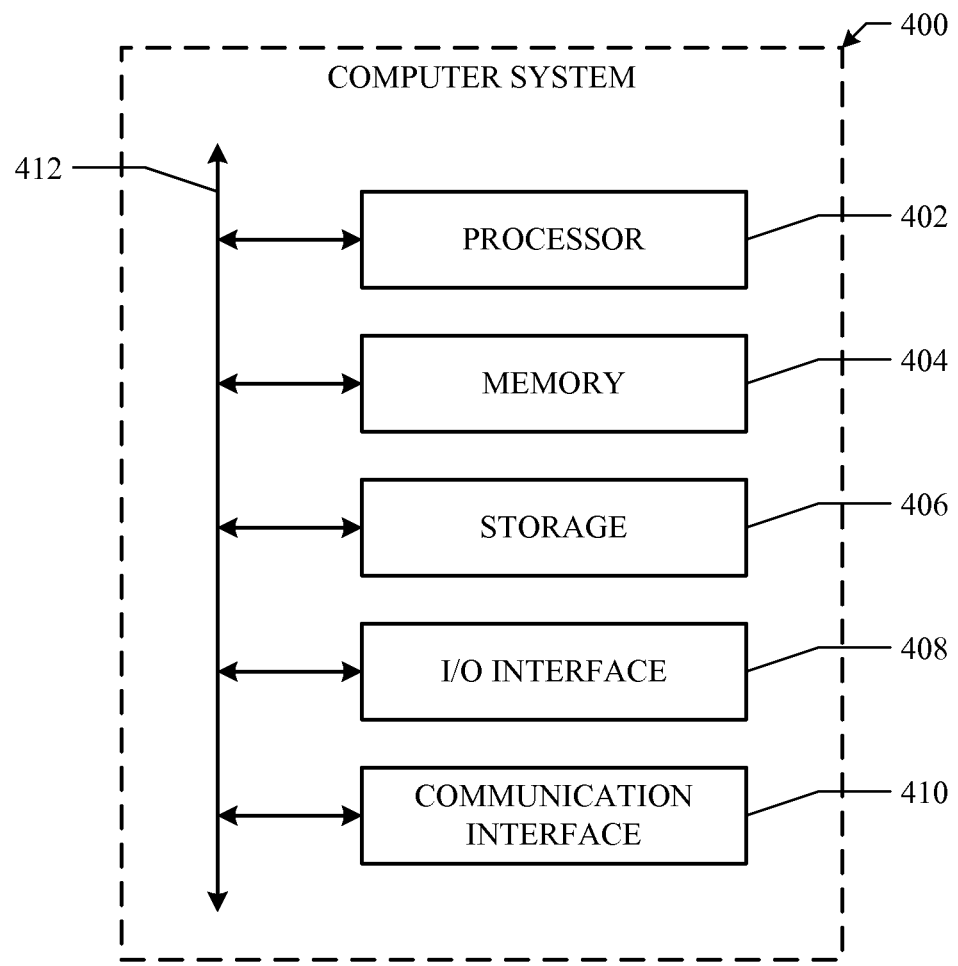
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
   receiving a request for a webpage of an online social network from a mobile-client system of a first user of the online social network, the request comprising an http-header generated by a web browser of the mobile-client system, wherein the http-header comprises one or more http-header fields;
   accessing, from a system of the online social network, a first information for customizing the format of webpages for display on the mobile-client system, the first information comprising one or more user-profile fields associated with a user profile of the first user on the online social network;

determining one or more attributes of the mobile-client system based on the http-header generated by the web browser of the mobile-client system and the first information accessed from the system of the online social network by comparing the one or more http-header fields and the one or more user-profile fields with a database of the online social network listing attributes of a plurality of types of mobile-client systems; and sending the webpage to the mobile-client system in response to the request, the formatting of the webpage being customized for display based on the determined attributes of the mobile-client system.

2. The method of claim 1, wherein the one or more http-header fields comprises at least a user-agent string describing one or more attributes of a browser client of the mobile-client system.

3. The method of claim 1, further comprising:
transmitting a survey to the first user; and
receiving in response to the survey the first information describing the first user.

4. The method of claim 3, wherein the survey is transmitted to the mobile-client system of the first user.

5. The method of claim 3, wherein the survey is transmitted to another client system of the first user.

6. The method of claim 3, wherein the first information of the survey describes one or more attributes of the mobile-client system of the first user.

7. The method of claim 1, wherein accessing the first information comprises receiving the first information from the mobile-client system.

8. The method of claim 1, wherein the one or more attributes of the mobile-client system comprise one or more of programming language support, style-sheet language support, screen size, screen pixel density, keyboard type, location-services support, wireless communication support, image support, or video support.

9. The method of claim 1, further comprising:
accessing a social graph of an online social network, the social graph comprising a plurality of nodes and a plurality of edges connecting the nodes, each of the edges between two of the nodes representing a single degree of separation between them, the nodes comprising:
a first-user node corresponding to the first user, the first user being associated with the online social network; and
a plurality of second nodes that each correspond to a second user associated with the online social network.

10. The method of claim 9, wherein the first information describing the first user comprises a user profile of the online social network corresponding to the first user.

11. The method of claim 9, wherein the first information describing the first user comprises information describing an employer of the first user, and wherein one or more second users with the same employer have mobile-client systems with one or more attributes.

12. The method of claim 9, wherein determining one or more attributes of the mobile-client system is further based on one or more user profiles of the online social network corresponding to one or more of the second users, respectively, each of the second users being within one degree of separation from the first user in the social graph.

13. The method of claim 1, wherein determining one or more attributes of the mobile-client system is further based on a browsing history associated with the first user.

14. The method of claim 1, wherein determining one or more attributes of the mobile-client system comprises:
calculating a score for each attribute based on the one or more http-header fields and the one or more user-profile fields; and
identifying each attribute having a score greater than a threshold score.

15. One or more computer-readable non-transitory storage media embodying software that is operable when executed to:
receive a request for a webpage of an online social network from a mobile-client system of a first user of the online social network, the request comprising an http-header generated by a web browser of the mobile-client system, wherein the http-header comprises one or more http-header fields;
access, from a system of the online social network, a first information for customizing the format of webpages for display on the mobile-client system, the first information comprising one or more user-profile fields associated with a user profile of the first user on the online social network;
determine one or more attributes of the mobile-client system based on the http-header generated by the web browser of the mobile-client system and the first information accessed from the system of the online social network by comparing the one or more http-header fields and the one or more user-profile fields with a database of the online social network listing attributes of a plurality of types of mobile-client systems; and
sending the webpage to the mobile-client system in response to the request, the formatting of the webpage being customized for display based on the determined attributes of the mobile-client system.

16. A system comprising: one or more processors; and a memory coupled to the processors comprising instructions executable by the processors, the processors operable when executing the instructions to:
receive a request for a webpage of an online social network from a mobile-client system of a first user of the online social network, the request comprising an http-header generated by a web browser of the mobile-client system, wherein the http-header comprises one or more http-header fields;
access, from a system of the online social network, a first information for customizing the format of webpages for display on the mobile-client system, the first information comprising one or more user-profile fields associated with a user profile of the first user on the online social network;
determine one or more attributes of the mobile-client system based on the http-header generated by the web browser of the mobile-client system and the first information accessed from the system of the online social network by comparing the one or more http-header fields and the one or more user-profile fields with a database of the online social network listing attributes of a plurality of types of mobile-client systems; and
sending the webpage to the mobile-client system in response to the request, the formatting of the webpage being customized for display based on the determined attributes of the mobile-client system.

17. The method of claim 1, wherein determining one or more attributes of the mobile-client system is further based on information accessed from an application installed on the mobile-client system.

18. The method of claim 1, wherein the information about the mobile-client system provided by the first user comprises one or more attributes of the mobile-client system.

19. The method of claim 1, wherein comparing the one or more http-header fields and the one or more user-profile fields with the database of the online social network listing attributes of a plurality of types of mobile-client systems comprises calculating a probability score for each attribute associated with the first the http-header and first information and selecting the attribute with the highest probability score.

* * * * *